United States Patent [19]

Yokoyama

[11] Patent Number: 5,088,343
[45] Date of Patent: Feb. 18, 1992

[54] ACCELERATOR PEDAL ASSEMBLY

[75] Inventor: Hiroshi Yokoyama, Zama City, Japan

[73] Assignee: Nissan Motor Co., Ltd., Yokohama City, Japan

[21] Appl. No.: 540,244

[22] Filed: Jun. 19, 1990

[30] Foreign Application Priority Data

Sep. 7, 1989 [JP] Japan .................. 1-232090

[51] Int. Cl.$^5$ .............................................. G05G 1/14
[52] U.S. Cl. ......................................... 74/560; 74/512
[58] Field of Search ............... 74/512, 474, 481, 513, 74/564, 560

[56] References Cited

U.S. PATENT DOCUMENTS 4,218,937  8/1980  Albrecht et al. .................... 74/513
4,356,740  11/1982  Kubo et al. ......................... 74/560

FOREIGN PATENT DOCUMENTS 454296  1/1949  Canada ............................... 74/560
1931356  12/1970  Fed. Rep. of Germany ........ 74/560
2523742  9/1983  France ................................ 74/560
56-40022  3/1980  Japan .
56-40023  3/1980  Japan .

Primary Examiner—Vinh T. Luong
Attorney, Agent, or Firm—Pennie & Edmonds

[57] ABSTRACT

An accelerator pedal assembly for use in a motor vehicle includes an elongate pivotal lever which is pivotally supported at its generally middle portion by a pivot shaft. The lever has thus upper and lower portions which are pivotally mounted to the lower portion of the lever. The upper end of the lever has a circular recess to which an accelerator cable is connected. The lever is equipped at the upper portion with a damping mass (or weight) for suppressing the undesired resonant vibration of the lever. The damping mass is so positioned that a center of gravity "G" of the damping mass is placed on an imaginary straight line "L" which passes through both given points "P" and "Q", the point "P" being the center of the pivoted middle portion of the lever and the point "Q" being the center of the circular recess of the lever. Thus, when the pedal is depressed, an inertial force of the damping mass does not produce a torsional stress in the lever because of no moment produced around the line "L".

4 Claims, 1 Drawing Sheet

ACCELERATOR PEDAL ASSEMBLY

BACKGROUND OF THE INVENTION

1. Field of the Invention

The present invention relates in general to an accelerator pedal assembly for use in a motor vehicle, and more particularly to an accelerator pedal assembly which has a damping mass (or weight) to prevent the accelerator pedal assembly from resonating with the vibration of a vehicular engine.

2. Description of the Prior Art

In order to clarify the task of the present invention, one conventional accelerator pedal assembly of the type equipped with a damping mess will be outlined with reference to FIG. 2 of the accompanying drawings.

The accelerator pedal assemblies of this type are described in Japanese Utility Model First Provisional Publications Nos. 56-40022 and 68-40023.

The accelerator pedal assembly shown in FIG. 2 comprises an elongate pivotal lever (or member) 1 which is pivotally supported as is generally middle portion (no numeral) by a pivot shaft 2. The lever 1 has thus upper and lower portions (no numerals) which are bounded by the pivoted middle portion. The lever 1 is so shaped or curved as not to interfere with other members located near the lever 1. A accelerator pedal 3 is secured to the lower portion of the lever 1, onto which a foot of a driver is adapted to put. The lever 1 has at the upper portion a semicircular recess 6 to which an accelerator cable 4 is connected. The cable 4 leads to a known mechanism for operating fuel supply means of the engine. Although not shown in the drawing, a spring is associated with the pivot shaft 2 to bias the lever 1 in a direction to raise the pedal 3.

In order to prevent the accelerator pedal assembly from resonating with the vibration of the engine, the lever 1 is equipped at the leading end of the upper Portion thereof with a damping mass 5 whose center of gravity is designated by reference "G".

When, thus, the pedal 3 is depressed by the driver against the biasing force of the spring, the lever 1 is pivoted about a pivot axis 12 in a direction to pull the accelerator cable 4. With this, the known mechanism of the fuel supply means is actuated.

However, hitherto, the positioning of the damping mass 5 for such an accelerator pedal assembly has been given little thought.

In fact, as is seen from FIG. 2, hitherto, the damping mass 6 (more specifically, the center G of gravity of the damping mass 5) is positioned away by a distance of "L" from an imaginary straight line "L" which passes through both points "P" and "Q", the point "P" being the center of the pivoted middle portion of the level 1, and the point "Q" being the center of the semicircular recess S.

This arrangement however induces the following drawback.

That is, when the pedal 3 is depressed, a considerable torsional stress is produced in the lever 1 due to a certain moment produced around the line "L", which moment is the product of an inertial force of the damping mass and the distance "L". This phenomenon however give the driver uncomfortable pedal feed and lowers the durability of the accelerator pedal assembly.

SUMMARY OF THE INVENTION

Therefore, it is an object of the present invention to provide an accelerator pedal assembly for use in a motor vehicle, which is free of the above-mentioned drawbacks.

According to the present invention, an accelerator pedal assembly comprises an elongate member on lever 1 provided with a circular recess 6 at the upper end portion A thereof for seating or attaching an end portion of an accelerator cable 4 in a conventional manner. An accelerator pedal 3 is pivotally attached to the lever at the lower end portion B in a conventional manner. A pivot shaft 2 which extends substantially perpendicular to the lever is attached to the lever between the upper and lower end portions for pivotally securing the lever to a fixed wall or surface of the motor vehicle in a conventional manner. A damping mass 5 is secured to the lever between the upper end portion and the pivot shaft so that the center of gravity G of the damping mass is positioned on an imaginary line L which passes through the center Q of the circular recess and the intersection center P where the longitudinal axis 14 intersects the longitudinal axis 12 of the pivot shaft so as to limit the torsional stress occurring in the pedal assembly.

BRIEF DESCRIPTION OF THE DRAWINGS

Other objects of the present invention will become apparent from the following description when taken in conjunction with the accompanying drawings, in which.

DETAILED DESCRIPTION OF THE INVENTION

Figure 1:
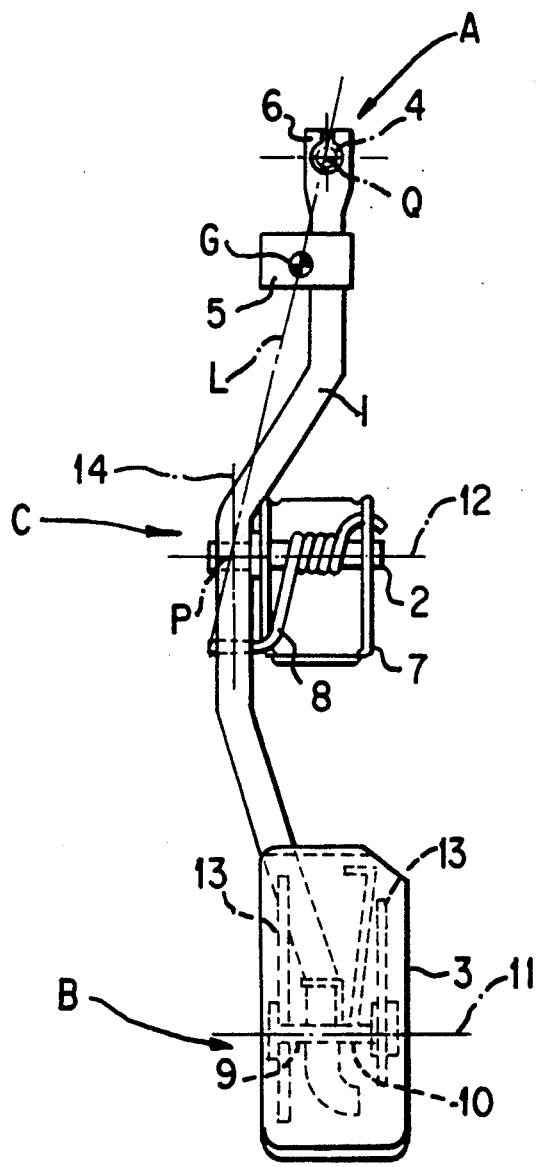
FIG. 1 is an elevational plan view of an accelerator pedal assembly according to the present invention.
Figure 2:
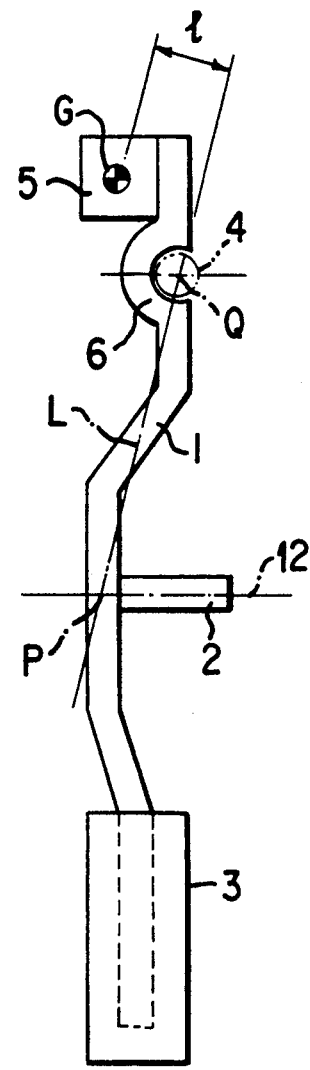
FIG. 2 is a view similar to FIG. 1, but showing a conventional accelerator pedal assembly.

Referring to FIG. 1, there is shown an accelerator pedal assembly of the present invention.

Similar to the above-mentioned conventional accelerator pedal assembly, an accelerator pedal assembly of the invention comprises an elongate pivotal lever or member) 1 which an has upper portion A and a lower portion B bounded by a pivoted middle portion C thereof. The lever 1 is so shaped as to avoid interference with other members located near the lever 1.

The pivoted middle portion C of the lever 1 has a pivot shaft 2 secured thereto. The pivot shaft 2 is Pivotally held by a supporting bracket 7 which is secured to a fixed member of the associated motor 20 vehicle. The lever 1 is thus permitted to pivot about an axis 12 of the pivot shaft 2 relative to the supporting bracket 7. A coil spring 8 is disposed about the pivot shaft 2 having one end hooked to the lower portion of the lever 1 and the other end hooked to the supporting bracket 7, so that the lever 1 is biased to pivot in a direction to raise the lower portion thereof.

An accelerator pedal 3 is pivotally mounted to the lower portion of the lever 1 through a pivot means. The pivot means comprises spaced wall members 13 secured to the pedal 3, and a pivot shaft 9 spanning between the spaced wall members 13. The pivot shaft g passes through a bore formed in the lower portion of the lever 1. Thus, the pedal 3 is permitted to pivot about an axis 11 of the pivot shaft 9 relative to the lever 1. A spring 10 is disposed at its turned portion about the pivot shaft 9 having one end hooked to the lever 1 and the other end attached to the pedal 3, so that the pedal 3 is biased to pivot in a direction to raise the upper portion of the pedal 3. As shown, the lower portion of the lever 1 has a bent end which abuts against a lower portion of the pedal 3 to suppress excessive raising of the upper portion of the pedal 3.

The upper end of the lever 1 has a circular recess to which an accelerator cable 4 is detachably connected. Although not shown in the drawing, the cable 4 has an enlarged head member latchingly engaged with the circular recess 6.

The lever 1 is equipped at the upper portion with a damping mass (or weight 5 for suppressing the undesired resonant vibration of the lever 1.

In the present invention, the following measure is employed in positioning the damping mass 5.

That is, the damping mass 5 is so positioned that a center of gravity "G" of the damping mass 5 is placed on an imaginary straight line "L" which passes through both given points "P" and "Q", the point "P" being the intersection center where the longitudinal axis 14 of the lever intersects the pivot axis 12 of the pivot shaft 2 and the point "Q" being the center of the geometric circular recess 6 of the lever 1.

Operation of the present invention will be described as follows, supposing a rest condition in which any depressing force is not applied to the pedal 3 against the biasing force of the springs 8 and 10.

When, under this condition, the pedal 3 is depressed by the driver, the lever 1 is forced to pivot about the axis 12 of the pivot shaft 2 relative to the supporting bracket 7 while pivoting the pedal 3 about the axis 11 of the pivot shaft 10 relative to the lever 1. With the pivotal movement of the lever 1, the accelerator cable 4 is pulled to actuate the known mechanism of the fuel supply means. With the pivotal movement of the pedal 3, the pedal is kept in flat contact with the sole of the driver's foot during the pedal depression.

As the depressing force on the pedal 3 increases, the lever 1 is pivoted further in the direction to pull the accelerator cable 4. With this, the fuel supply means supplies more fuel. While, as the depressing force decreases, the lever 1 is pivoted in the opposite direction due to the biasing force of the spring 8. With this, the fuel supply means supplies less fuel. When the depressing force on the pedal 3 is removed, positions of the lever 1 and the pedal 3 return to the original positions of the rest condition.

Advantages of the present invention over the conventional accelerator pedal assembly will be described in the following.

As described hereinabove, the center of gravity G of the damping mass 5 is positioned on the imaginary straight line "L" which passes through both given points "P" and "Q". That is, when the pedal 3 is depressed, any torsional stress is not produced in the lever 1 because of the inertial force of the damping mass 5 acting on the line "L" or no moment of the damping mass 5 produced around the line "L".

Thus, the undesired phenomena, which are the uncomfortable pedal feel and lowering of the assembly's durability, are not produced or at least minimized.

What is claimed is:

1. An accelerator pedal assembly for use in a motor vehicle having an accelerator cable with an end mounting portion, said accelerator pedal assembly comprising:
   an elongate member having an upper end portion and a lower end portion, said upper end portion having a recess for detachably seating an end mounting portion of an accelerator cable;
   an accelerator pedal mounted to said lower end portion of said elongate member;
   pivot shaft extending laterally of said elongate member for pivotally supporting said elongate member said pivot shaft being situated between said upper and lower end portions; and
   a damping mass secured to said elongate member between said upper end portion and said given shaft so that a center of gravity of said damping mass is positioned to lie on an imaginary straight line which passes through a geometric center of said recess and in intersection point where an longitudinal axis of said elongate member intersects a longitudinal axis of said pivot shaft so that when said accelerator pedal is depressed by applying force, no torsional stress is produced in said elongate member.

2. An accelerator pedal assembly as claimed in claim 1, further comprising biasing means for raising said lower end portion of said elongate member to raise said accelerator pedal.

3. In a vehicle having an accelerator pedal assembly for use with an accelerator cable having an end mounting portion, said pedal assembly comprising:
   an elongate lever having a pair of end portions and a pivot shaft extending laterally thereof and positioned between said end portions;
   means for pivotally supporting said lever about said pivot shaft;
   a recess for detachably seating an end portion of an accelerator cable being formed at one of said end portions of said lever;
   an accelerator pedal mounted on the other of said pair of end portions; and
   a damping mass mounted on said lever between said one end portion and said pivot shaft so that a center of gravity of said damping mass is positioned to lie on an imaginary straight line which passes through a geometric center of said recess and an intersection point where an longitudinal axis of said lever intersects a longitudinal axis of said pivot shaft so that when said accelerator pedal is depressed by applying force, no torsional stress is produced in said elongate member.

4. An automotive accelerator pedal for use with an automobile having an accelerator cable with an end mounting portion, comprising:
   an elongated lever having a pair of end portions and a pivotally attaching means for pivotally attaching said lever to a fixed surface of said automobile and positioning between said end portions;
   a recess for seating an end mounting portion of an accelerator cable being formed on one of said end portions;
   an accelerator pedal mounted on the other of said end portions; and
   means for reducing torsional stress in said lever when said lever is pivoted by an application of force to said accelerator pedal, said torsional stress reducing means including:
   a damping mass mounted on said lever between said one end portion and said pivotally attaching means, wherein a center of gravity of said damping mass is positioned to lie on an imaginary straight line which passes through a geometric center of said recess and an intersection point where an longitudinal axis of said lever intersects a pivotal axis of said pivotally attaching means.

* * * * *